(12) United States Patent
Fisch et al.

(10) Patent No.: US 11,014,996 B2
(45) Date of Patent: May 25, 2021

(54) MULTISITE HETEROGENEOUS CATALYST, PROCESS FOR PREPARING THE SAME AND PROCESS FOR OBTAINING POLYOLEFINS USING SAID CATALYST

(71) Applicant: Braskem S.A., Camaçari (BR)

(72) Inventors: Adriano Giraldi Fisch, Canoas (BR); Maila Noeli Cardoso, Novo Hamburgo (BR); Rodrigo Brambilla, Porto Alegre (BR)

(73) Assignee: Braskem S.A., Camaçari (BR)

( * ) Notice: Subject to any disclaimer, the term of this patent is extended or adjusted under 35 U.S.C. 154(b) by 201 days.

(21) Appl. No.: 16/097,019

(22) PCT Filed: May 25, 2016

(86) PCT No.: PCT/BR2016/050113
§ 371 (c)(1),
(2) Date: Oct. 26, 2018

(87) PCT Pub. No.: WO2017/185149
PCT Pub. Date: Nov. 2, 2017

(65) Prior Publication Data
US 2019/0127498 A1 May 2, 2019

(30) Foreign Application Priority Data
Apr. 27, 2016 (BR) .......................... 1020160093783

(51) Int. Cl.
*C08F 10/02* (2006.01)
*C08F 4/64* (2006.01)
*C08F 4/16* (2006.01)
*C08F 4/654* (2006.01)
*C08F 4/642* (2006.01)

(52) U.S. Cl.
CPC .............. *C08F 10/02* (2013.01); *C08F 4/642* (2013.01); *C08F 4/6545* (2013.01); *C08F 2410/03* (2013.01); *C08F 2410/04* (2013.01)

(58) Field of Classification Search
CPC ........ C08F 10/02; C08F 4/6545; C08F 4/642; C08F 4/16; C08F 4/64
See application file for complete search history.

(56) References Cited

U.S. PATENT DOCUMENTS

| 5,292,837 A | 3/1994 | Heinrich et al. |
| 5,648,309 A | 7/1997 | Boehm |
| 8,557,931 B2 | 10/2013 | Brita et al. |

FOREIGN PATENT DOCUMENTS

| WO | 2012/069400 A1 | 5/2012 |
| WO | 2013/092453 A1 | 6/2013 |
| WO | 2013/093930 A1 | 6/2013 |

*Primary Examiner* — Catherine S Branch
(74) *Attorney, Agent, or Firm* — Duane Morris LLP

(57) ABSTRACT

The instant invention relates to the use of titanium-based oxopolymers for preparing suitable catalysts for reactions of olefin polymerization and/or olefin and alpha-olefin copolymerization. The instant invention further discloses the synthesis of catalyst formulated from titanium-based oxopolymers, as well as its use for olefin polymerization and/or copolymerization reactions.

14 Claims, 3 Drawing Sheets

(a)

(b)

MULTISITE HETEROGENEOUS CATALYST, PROCESS FOR PREPARING THE SAME AND PROCESS FOR OBTAINING POLYOLEFINS USING SAID CATALYST

FIELD OF THE ART

The instant invention relates to the synthesis and use of titanium-based oxopolymers for preparing suitable catalysts for reactions of olefin polymerization and/or olefin and alpha-olefin copolymerization. The instant invention further discloses the synthesis of catalyst formulated from titanium-based oxopolymers, as well as olefin polymerization and/or copolymerization reactions using the same.

DESCRIPTION OF THE STATE OF THE ART

There are several chemical compounds capable of catalyzing reactions of olefin polymerization and olefin and alpha-olefin copolymerization. To better differentiate between these different compounds, they can be classified in: (i) Ziegler-Natta catalysts, (ii) Phillips catalysts, (iii) metallocene catalysts, and (iv) post-metallocene catalysts. Another possible classification refers to the multiplicity of types and nature of active sites present in the catalysts, comprising single-site catalysts and multi-site catalysts. Furthermore, catalysts used for olefin polymerization and olefin and alpha-olefin copolymerization are classified according to their ability to dissolve in the polymerization reaction medium, wherein homogeneous catalysts are those soluble in the medium, while heterogeneous catalysts are those insoluble in the polymerization medium. A more detailed description of the types of catalysts and their use in olefin polymerization if found in B. Krentsel, Y. V. Kissin, V. J. Kleiner e L. L. Stotskaya, *Polymers and Copolymers of Higher Alpha-olefins*, Cincinnat: Hanser, 1997.

Suitable catalysts must be able of polymerizing olefins, as well as copolymerizing olefins and alpha-olefins at high productivity, resulting in polymers of average molar mass and molar mass distribution suitable for manufacturing different products typical of polyolefins application such as, for instance, tubular films and drums.

Patent application No. WO093930/2013 relates to the use of an external dialkyl dialkoxysilane donor in the synthesis of Ziegler-Natta catalyst for use in suspension technology plants. The authors of this application declare that the use of this compound generates a catalysts having a greater average molar mass and a narrower molar mass distribution when compared with a similarly synthesized catalyst in the absence of said external donor. Similarly, patent No. WO092453/2013 discloses that the combination of different Ziegler-Natta catalysts together with the use of modifying compounds, such as chlorinated alkanes and alkoxysilanes, when added directly to the polymerization reactor allows to produce polymers having controlled molar mass distribution, and thus having differentiated properties. U.S. Pat. No. 8,557,931 discloses that polymers having differentiated properties are obtained through a suspension process by using a Ziegler-Natta catalyst synthesized from a magnesium chloride support with suitable characteristics of pore morphology. According to this patent, the catalyst can produce polyethylene for manufacturing tubular films processed with bubble stability and reduction of gel content, thus maximizing their mechanical and optical properties. In view of the catalyst performance in the suspension polymerization process, patent documents Nos. PI8803596-4, PI9002290-4, U.S. Pat. Nos. 5,292,837 and 5,648,309 disclose that the apparent density of the polymer powder and the average size thereof may be appropriately controlled from the catalyst synthesis, specifically, from the synthesis of magnesium chloride support. Patent Application No. WO069400/2012 describes that the synthesis of magnesium chloride support from chlorination of magnesium ethoxylate precursor in the form of particles with an average diameter of 1 μm results in a catalyst able of producing polyethylene for blast articles processing with high dimensional stability.

In general, and as exemplified by the documents described in the prior art review, different methods can be employed in the synthesis of Ziegler-Natta catalyst in order to generate a catalyst able to polymerize and/or copolymerize ethylene, thus producing a polymer having differentiated properties. According to the documents mentioned in the review, the use of modifiers, for instance of the external donor type, or the use of supports with a certain pore morphology, average diameter, for instance, are capable of generating catalysts having outstanding performance regarding the properties of the polymer they produce.

Organometallic compounds of oligomeric molecular structure are not disclosed in the prior art as chemical compounds capable of polymerizing and/or copolymerizing olefins and alpha-olefins. Moreover, these compounds are not used to modify catalysts. This makes this class of compounds industrially attractive. Hence, it is crucial to evaluate and characterize new catalysts formulated from organometallic chemical compounds with oligomeric molecular structure to provide the most promising alternatives for catalyzing reactions of olefin polymerization and copolymerization, in order to obtain high productivity and polymers with enhanced characteristics.

OBJECTIVES OF THE INVENTION

The objective of the invention is that of providing multisite heterogeneous catalysts whose formulation contains titanium-based oxopolymers to produce polyolefins with enhanced characteristics and whose properties can be advantageously regulated according to the intended application. The oxopolymers of the instant invention are titanium-based organometallic compounds having an oligomeric structure.

BRIEF DESCRIPTION OF THE INVENTION

The instant invention relates to a titanium-based organometallic chemical compound having oligomeric molecular structure, suitable for the preparation of catalysts able to polymerize olefins and copolymerize olefins and alpha-olefins. More specifically, the compound is called titanium oxopolymer and it is used to formulate multisite heterogeneous catalysts for olefin polymerization and/or olefin and alpha-olefin copolymerization.

The chemical formula representing titanium oxopolymers is given in equation 1 below:

$$(R^a)_p M^a (O-Ti-O)_n M^b (R^b)_q \qquad (1)$$

where: (O—Ti—O) is the monomeric unit of the oligomer formed by n units; $R^{a,b}$ are alike or different substituents, and may be a halogen or an alkoxy group of linear or branched or cyclic or even aromatic chain; $M^{a,b}$ are alike or different and may be transition metals of groups 4, 5 or 6 or, even, semi-metals of group 14 of the periodic table. As a restriction, the sub-indexes p and q of the substituents must satisfy the coordination number of the respective M, and the polymerization level n must be higher than or equal to 3.

In this invention, titanium oxopolymers represented in Equation 1 can be synthesized via non-hydrolytic sol-gel route, a technique widespread in the literature. Examples of this technique, among others based also on sol-gel synthesis, are available in the literature (C. J. Brinker e G. H. Scherer, "Sol-gel Science", New York: Academic Press, 2010) to synthesize organometallic compounds having oligomeric structure, inter alia, titanium oxopolymers.

Oligomeric organometallic compounds described in this invention can catalyze the reaction of olefins polymerization and/or olefin and alpha-olefin copolymerization and have a molecular volume 2 to 100 times greater than the equivalent volume of its monomer, that is, its starting reagent.

During the catalyst synthesis, the step of incorporating titanium oxopolymers into the heterogeneous support can be carried out by using techniques well-known in the literature, such as impregnation or precipitation (R. L. Augustine, *Heterogeneous Catalysis for the Synthetic Chemist*, New York: Marcel Dekker, 1995; J. W. Geus e J. A. R. van Veen, "Preparation of Supported Catalysts", em *Catalysis*, J. A. Moulijn, P. W. N. M. van Leeuwen e R. A. van Santen, Eds., Amsterdam, Elsevier, 1993, pp. 342-360; F. Schuth, M. Hesse e K. K. Unger, "Precipitation and Coprecipitation em Handbook of Heterogeneous Catalysis", vol. 1, G. Ertl, H. Knozinger, F. Schuth e J. Weitkamp, Eds., Weinheim, Wiley-VCH, 2008 e G. Rothenberg, Catalysis, Weinheim: Wiley-VCH, 2008).

DETAILED DESCRIPTION OF THE INVENTION

Figure 1:
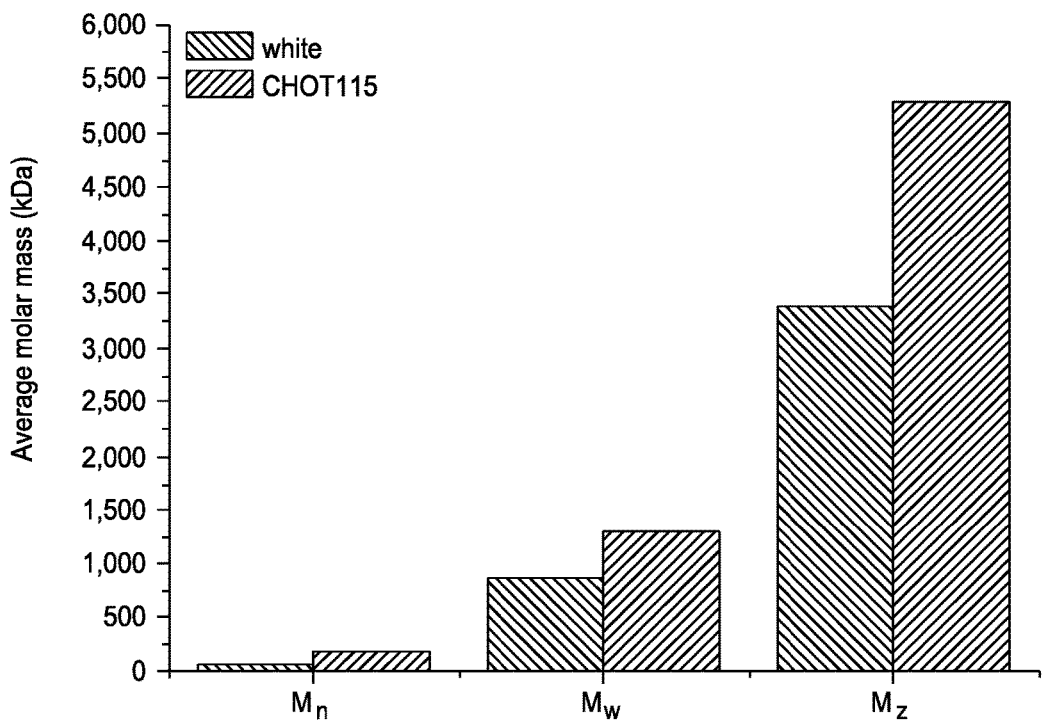
FIG. 1: Comparison of the catalyst CHOT115 tested in Example 2 with the white catalyst.

The instant invention relates to an organometallic chemical compound called titanium oxopolymer, said compound having an oligomeric molecular structure and being capable of catalyze the reaction of olefin polymerization and/or olefin and alpha-olefin copolymerization. Titanium oxopolymer is used to formulate multisite heterogeneous catalysts, being incorporated thereinto by impregnation or precipitation.

Titanium Oxopolymer Synthesis

Titanium oxopolymer synthesis takes place via non-hydrolytic sol-gel-route, among other techniques widespread in the literature to achieve this result. In the non-hydrolytic sol-gel route (L. Bourget, R. J. P. Corriou, D. Leclereq, P. H. Mutin e A. Vioux, "Non-hydrolytic Sol-gel Routes to Silica", *Journal Non-crystaline Solids*, vol. 242, pp. 81-92, 1998), titanium oxopolymers can be produced by the chemical reaction between titanium chloride (IV) and titanium tetralkoxide (IV) and catalyzed by a Lewis acid, such as, ferric chloride (III), aluminum chloride or magnesium chloride, to name some.

The reaction takes place at a temperature of about 90-150° C., but, depending on the Lewis acid that is used, can be decreased or increased to ensure the full conversion of the reagents.

The total time of reaction is about 2-12 h.

The reaction must take place preferably in a closed reactor under agitation and in a system suitable for heating and cooling. Given that both the reagents and the products are sensitive to moisture and oxygen, they should be handled in an inert atmosphere.

The reaction product, titanium oxopolymer, as well as part of the by-products and product unconverted reagents are obtained in the form of a solution in the reaction solvent. In a preferred embodiment, no step involving the purification of titanium oxopolymers is undertaken. However, the final solution can be concentrated or diluted.

The polymerization level is controlled by the stoichiometric ratio of the reagents, as it is done for a polycondensation reaction, according to the scheme in Equation 2:

$$P_x + P_y \rightarrow P_{x+y} + L_{x \in \{1,2,\ldots,\infty\}; y \in \{1,2,\ldots,\infty\}} \quad (2)$$

where: $P_x$ and $P_y$ indicate the chains of a polymer of polymerization level x and y, respectively, and L is the byproduct of reduced molar mass.

According to the foregoing, the synthesis reaction of titanium oxopolymers, aimed at producing polymerization catalysts, can proceed in conformity with the stoichiometry ratios shown in Equation 3:

$$CT:TAT = (1.5-3):1 \quad (3a)$$

$$TAT:CT = (1.5-3):1 \quad (3b)$$

where: CT indicates the titanium chloride precursor (IV) and TAT, titanium tetralkoxide (IV).

The average molecule size of titanium oxopolymer depends on the polymerization level. Catalysts formulated with titanium oxopolymers of different sizes exhibit different performances, both in terms of catalyst productivity and properties of produced polyolefin. The results shown in Example 1 detail the influence of reagent molar ratio on the performance of the catalyst formulated from titanium oxopolymer.

The alkoxide group may be replaced by only one alkyl group, or even by a combination of the following groups: methyl, ethyl, propyl, 2-propyl, butyl, 2-butyl, 2,2-dimethylethyl, 2-ethylhexyl, to name some. The selection of the alkyl group depends (i) on the solubility it provides to the product of the reaction and (ii) on the performance of the catalyst formulated with synthesized titanium oxopolymer, mainly in terms of desired properties of the polymer.

The type of Lewis acid and the amount used in this sol-gel reaction affect the reaction time, as suggested in the literature (L. Bourget, R. J. P. Corriou, D. Leclereq, P. H. Mutin e A. Vioux, "Non-hydrolytic Sol-gel Routes to Silica", *Journal Non-crystaline Solids*, vol. 242, pp. 81-92, 1998). The selection of the suitable Lewis acid depends on the reaction time and on the commercial availability thereof. In general, the amount of Lewis acid used in the sol-gel reaction is approximately 0.2 mass % with respect to the sum of the masses of titanium chloride and titanium tetralkoxide used.

The reaction medium is preferably an organic, aliphatic solvent. However, the selection of a suitable solvent depends on: the reagent reactivity, reagent solubility, products and by-products of the sol-gel reaction, volatility, purification and recycling, and commercial availability.

The typical recipe for titanium oxopolymer synthesis is listed below:

(i) In a closed reactor, under agitation, dissolve all of the reagents, titanium chloride (IV) or titanium tetralkoxide (IV) in the solvent. Preferably use titanium tetralkoxide (IV) and hexane as solvent;

(ii) Add to the mixture obtained in item (i) the Lewis acid in its entirety. Preferably use aluminum chloride as Lewis acid;

(iii) Slowly dispense the second reagent, titanium chloride (IV) or titanium tetralkoxide (IV) to the mixture of item (ii). The addition rate of this component must be such that the temperature of the reaction medium is controlled between 20-50° C., preferably not higher than 40° C. Preferably dispense titanium chloride (IV) in this step;

(iv) Increase the temperature of the reaction medium formed by the mixture of item (iii) to 90-150° C., preferably 120° C.;

(v) Leave the reaction medium resulting from (iv) under agitation for 2-12 h, preferably 4 h;

(vi) Following the time established in (v), cool at room temperature and store the solution of titanium oxopolymer such as obtained.

Catalyst Preparation

Synthesized titanium oxopolymers are used to prepare the multisite heterogeneous catalyst. These catalysts can polymerize olefins and/or copolymerize olefins and alpha-olefins.

Heterogeneous catalysts consists of mainly two parts: (i) support and (ii) catalytic complexes. The support has the peculiar function of carrying the catalytic complexes; while, the latter trigger the polymerization reaction.

In this invention, the incorporation of titanium oxopolymer into the support can take place by (i) impregnation of the available pore volume thereof from a titanium oxopolymer solution or (ii) precipitation of titanium oxopolymer in the area available on the support surface. In this invention, precipitation is preferred in technical terms.

Magnesium chloride and silica are usually materials used as support for olefin polymerization catalysts. However, the use of other materials, both organic and inorganic, is widely studied and widespread in the literature (let us mention, for instance, J. C. Chadwick, T. Garoff and J. R. Severn, "Traditional Heterogeneous Catalyst" in *Tailor-made Polymers*, J. R. Severn and J. C. Chadwick, Eds., Weinheim, Wiley-VCH, 2008). Magnesium chloride is preferred in this invention.

In general and regardless of the material, the support needs to be physically or chemically treated to adapt its surface to receive the active sites. Physical treatments include, for instance, calcining and grinding; while chemical treatments include the reaction between the support and surface modifying agents, or even support dissolution and reprecipitation (Y. Kissin, Alkene Polymerization Reaction with Transition Metal Catalysts, Amsterdam: Elsevier, 2008, pp. 277-284; and J. C. Chadwick, T. Garoff and J. R. Severn, "Traditional Heterogeneous Catalyst" in *Tailor-made Polymers*, J. R. Severn and J. C. Chadwick, Eds., Weinheim, Wiley-VCH, 2008).

The typical recipe to prepare the catalyst using preferably magnesium chloride as a support and including the step of immobilization of titanium oxopolymers therein, is listed below:

(i) In a ball mill, grind the support in the presence of an internal donor, if desired. Preferably grind the support for 2-12 h, preferably 4 h, at room temperature; Sauter average particle size should be of the order of 1-50 μm, preferably, 8-12 μm;

(ii) After the grinding step (i), store the treated support;

(iii) Add a solvent volume to a vessel provided with agitation and then add the support treated and stored in item (ii); maintain the suspension thus formed at a temperature of 2-10° C., preferably 5° C.;

(Iv) Slowly dispense titanium chloride to the suspension formed in item (iii); The temperature of the suspension during dispensing should be maintained between 2-10° C. preferably 5° C. by cooling, if necessary. This step may be repeated so that the treated magnesium chloride adsorb the desired amount of titanium chloride;

(v) Filter the solid obtained in item (iv) and dry under vacuum. Thus, the obtained solid is called pre-catalyst and can be stored such as it is obtained;

(vi) Add a volume of solvent to a vessel provided with agitation;

(vii) Add the pre-catalyst of item (v) to the solvent of item (vi), keeping the obtained suspension under agitation;

(viii) Add a reducing agent in its entirety to the suspension of item (vii) and leave under agitation;

(ix) Under agitation, dispense the titanium oxopolymer in solution to the suspension obtained in item (viii); the addition rate of the titanium oxopolymer solution must be such as to avoid the formation of lumps in the same solution or its deposition on the walls of the vessel; If necessary, the titanium oxopolymer solution can be diluted;

(x) Raise the temperature of the suspension obtained in item (ix) to 40-100° C., preferably 60° C., and leave under agitation for 1-10 h, preferably 2 h;

(xi) Following the agitation time described in item (x), reduce the temperature of the suspension and store such as it is obtained to be used as a multisite heterogeneous catalyst.

The titanium oxopolymer-based multisite heterogeneous catalyst of the instant invention can be used with success in reactions of olefin polymerization and/or olefin and alpha-olefin copolymerization.

The productivity of the catalyst according to the instant invention and the properties of the polymer obtained with the catalyst are superior, especially in terms of average molar mass. The heterogeneous catalysts formulated with titanium oxopolymers in the instant invention have a reduced reactivity to hydrogen, when this is used as regulator agent of average molar mass.

Furthermore, a combination with other types of catalytic compounds, which can also polymerize olefins or copolymerize olefins and alpha-olefins allows producing polymers with a precise adjustment of molar mass distribution and/or chemical composition distribution. Thus, polymers with specific properties to the application can be produced from the use of the organometallic compounds described in the invention.

Examples are described to highlight the polymerization ability of a catalyst synthesized with titanium oxopolymer in its formulation and the differentiated properties of the produced polymer with its use.

EXAMPLES

Some experiments with respect to the use of the titanium oxopolymer in the catalyst formulation are provided below. These experimental data highlight show the scope and range of this invention without, however, being considered limiting in any way. In order to emphasize the invention applicability, Examples 1 and 2 refer to the catalytic tests on a laboratory scale; while Example 3 shows the use of the synthesized catalyst using titanium oxopolymers in the copolymerization of ethylene and 1-butene in a pilot plant scale.

Example 1

In this example, titanium oxopolymers were synthesized with molar ratios of CT:TAT=1:1.5 and CT:TAT=1:3, and the respective produced titanium oxopolymers were used to formulate multisite heterogeneous polymers. In turn, the catalysts were used to polymerize ethene and the performance results of the produced polyethylene catalysts were analyzed. The recipe described below was used to synthesize titanium oxopolymers with molar ratio of CT:TAT=1:1.5.

(i) In a close reactor, provided with agitation, 3.168 g of titanium chloride (IV) were dissolved in about 20 mL of n-octane PA;

(ii) 0.1 g of ferric chloride (III) was added to item (i);

(iii) 8.454 g of titanium tetrabutoxide was added to the mixture of item (ii) at a rate of about 0.7 g·min$^{-1}$, to maintain the temperature of the reaction medium below 40° C. during this step;

(iv) The temperature of the reaction medium formed by the mixture of item (iii) was raised to 90-150° C., preferably 120° C.;

(v) The reaction medium resulting from item (iv) was under agitation for 240 min at 120° C.;

(vi) Following the time established in (v), the obtained mixture was cooled at room temperature and stored such as obtained.

The recipe described above was repeated by changing (i) the mass of titanium chloride (IV) to 1.980 g (employed in item (i)), and (ii) the mass of titanium tetrabutoxide (IV) to 10.567 g (employed in item (iii)). The titanium oxopolymer obtained from the modified recipe has molar ratio of CT:TAT=1:3. For your reference, titanium oxopolymers synthesized with ratio TC:TAT=1:1.5 and CT:TAT=1:3 were named respectively as OT115 and OT130.

The catalyst preparation was conducted as described below. Both titanium oxopolymers, OT115 and OT130, were used with the aim to compare the results and to evidence the performance.

(i) In a ball mill, 20 g of magnesium chloride were ground at room temperature (25° C.) and inert atmosphere (nitrogen);

(ii) After the grinding step of item (i), the treated magnesium chloride was stored;

(iii) 700 mL of n-hexane were added to a glass vessel provided with mechanical agitation and, after that, the previously stored magnesium chloride was added; the temperature of the suspension was kept at 5° C. with the aid of a thermostatic bath;

(Iv) 20 g of titanium chloride was slowly dispensed to the suspension of item (iii); the temperature during dosing was maintained at 5° C.;

(v) The solid obtained in item (iv) was filtered and dried under vacuum for 2 h; solid product was called pre-catalyst and stored such as it was obtained under inert atmosphere;

(vi) 40 mL of n-hexane were added to a vessel provided with agitation;

(vii) 1 g of the pre-catalyst was added to the solvent of item (vi), keeping the obtained suspension under agitation;

(viii) Triethylaluminum (TEA) was added as reducing agent to the suspension of item (vii) and this was left under agitation for 20 minutes; the molar ratio Al/Ti used was of 1.05, considering the Ti impregnated in the pre-catalyst;

(ix) Under agitation, 0.21 mL of titanium oxopolymer solution (OT115 or OT130) was added to the suspension obtained in item (viii); the addition rate is 10 µL·min−1;

(x) The temperature of the suspension obtained in item (v) was raised to 60° C. and the suspension was left under agitation for 2 h;

(xi) Following the agitation time described in item (x), the temperature of the suspension was reduced to room temperature (25° C.) and the same was stored such as it was obtained to be used as a multisite heterogeneous catalyst.

The recipe described above was repeated changing the type of used titanium oxopolymer solution (OT115 or OT1130) in item (ix). For your reference, when OT115 was used, the final catalyst is referred to as CHOT115; and when OT130 was used, the final catalyst is referred to as CHOT130.

Heterogeneous catalysts CHOT115 and CHOT130 were tested in ethene polymerization at the same reaction conditions, according to Table 1. Polymerization took place in a steel reactor of 0.3 L, in a semi-batch system with temperature controlled by a thermostatic bath and the total pressure controlled by the flow rate of ethylene, which is continuously added to the reactor.

TABLE 1

| Polymerization conditions | | |
| --- | --- | --- |
| Parameter | Value | Unit |
| Reaction medium volume | 0.2 | L |
| Temperature | 80 | ° C. |
| Time | 60 | s |
| [Ti] | 3 × 10$^{-5}$ | M |
| Al(TEA)/Ti | 50 | — |
| Ethylene partial pressure | 2 | bar |

The reaction took place in the absence of hydrogen and comonomers.

Hexane was pretreated with molecular sieves 3A and 13X.

The polymer resulting from the polymerization experiment of the heterogeneous catalyst was dried at room temperature for 24 h before its mass was determined for the calculation of the catalytic productivity (Equation 4) and before undergoing characterization. The obtained dried polymer was characterized by its molar mass distribution, which was determined by gel permeation chromatography (GPC).

$$p = \frac{m}{[Ti]V} \frac{f_{Ti}}{48} \quad (4)$$

where: p is the productivity ($g_{pol} \cdot g_{cat}^{-1}$), m is the mass of the polymer (g), [Ti] is the molar concentration of Ti in the polymerization, V is the volume of the reaction medium (L) and $f_{Ti}$ is the mass fraction of Ti in the catalyst (adimensional).

The obtained results (please check Table 2) highlight that the catalyst CHOT115 has a higher catalytic productivity than CHOT130. Average molar masses $M_n$, $M_w$ and $M_z$ of the polymer obtained with the catalyst CHOT115 are also higher. The molar mass distribution amplitude, assessed by the values Mw/Mn and $M_z/M_n$, is reduced when compared to the one of the polymer obtained with CHOT130. These results clearly highlight the possibility of controlling the performance of the final catalyst and the properties of the polymer produced with this catalyst through oxopolymer synthesis alternatives, in this case, the molar ratio CT:TAT.

TABLE 2

Characterization of resin and catalyst performance.

| Parameter | CHOT 115 | CHOT 130 | Unit |
|---|---|---|---|
| p | 3744 | 1885 | gpol · gcat$^{-1}$ |
| Mn | 201 | 102 | Da |
| $M_w$ | 1383 | 974 | Da |
| $M_z$ | 5533 | 4331 | Da |
| Mw/Mn | 6.9 | 9.5 | |
| Mz/Mn | 4.0 | 4.4 | — |

Example 2

In this example, the average molecular masses ($M_n$, $M_w$ and $M_z$) of the polymer produced with the CHOT115 catalyst are compared with those of a catalyst produced through the previously described recipe, but without incorporating the titanium oxopolymer OT 115, so as to serve as a blank test. As shown in the results of FIG. 1, the polymer obtained with CHOT115 exhibits average molecular masses higher than the respective ones of the polymer produced with the white catalyst. This result highlights the participation of the titanium oxopolymer, which was incorporated into the catalyst by precipitation, in the determination and/or control of the properties of the produced polymer.

Example 3

In this example, the recipe of the catalyst CHOT115 was carried out to obtain 22 kg of catalyst and this was tested in a polymerization process in ethylene slurry (50 kg·h$^{-1}$ of PEAD of productive capacity). The objective of this test is that of assessing the performance of the multisite heterogeneous catalyst synthesized with titanium oxopolymer in pilot scale and look for evidence of its employability in industrial process. The assessment was carried out by comparison with a catalyst that has already been used in an industrial polymerization process in ethylene slurry, referred to as CHInd, for your reference. The CHInd synthesis route is described in document No. PI8803596-4.

Figure 2:
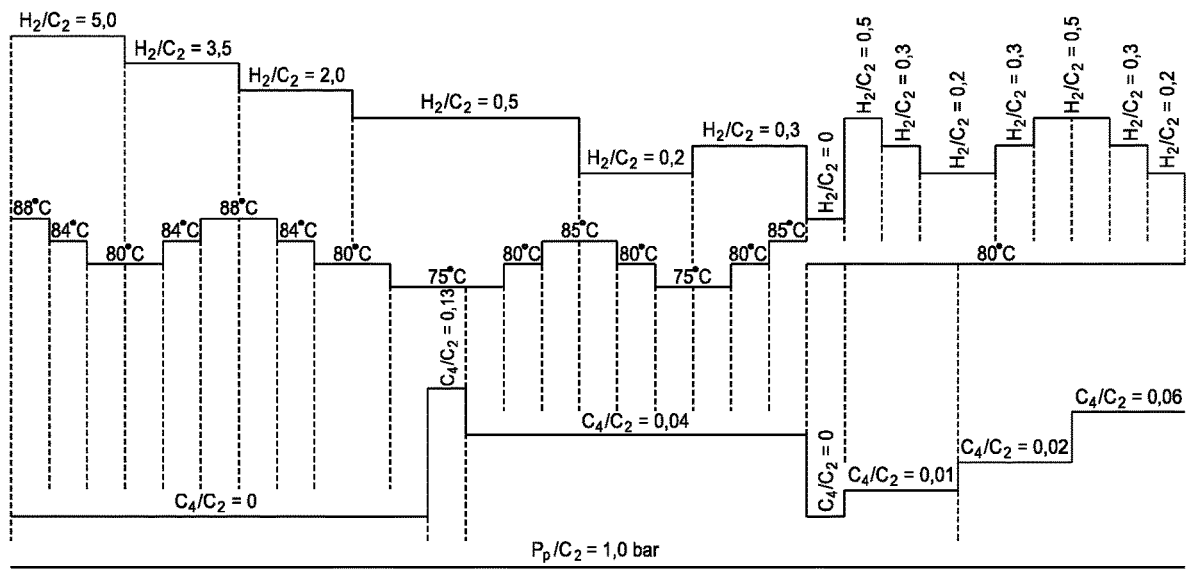
FIG. 2: Operational parameters of the test in pilot plant conduced in Example 3. ppC2 is the partial pressure of ethylene in the reactor, H2/C2 is the moral ratio of hydrogen to ethylene in the reactor dome and C4/C2 is the molar ratio of 1-butane (used as comonomer) to ethylene in the reactor dome.

FIG. 2 shows the reaction parameters used throughout the test in pilot scale for the two tested catalysts (CHOT115 and CHInd).

Figure 3:
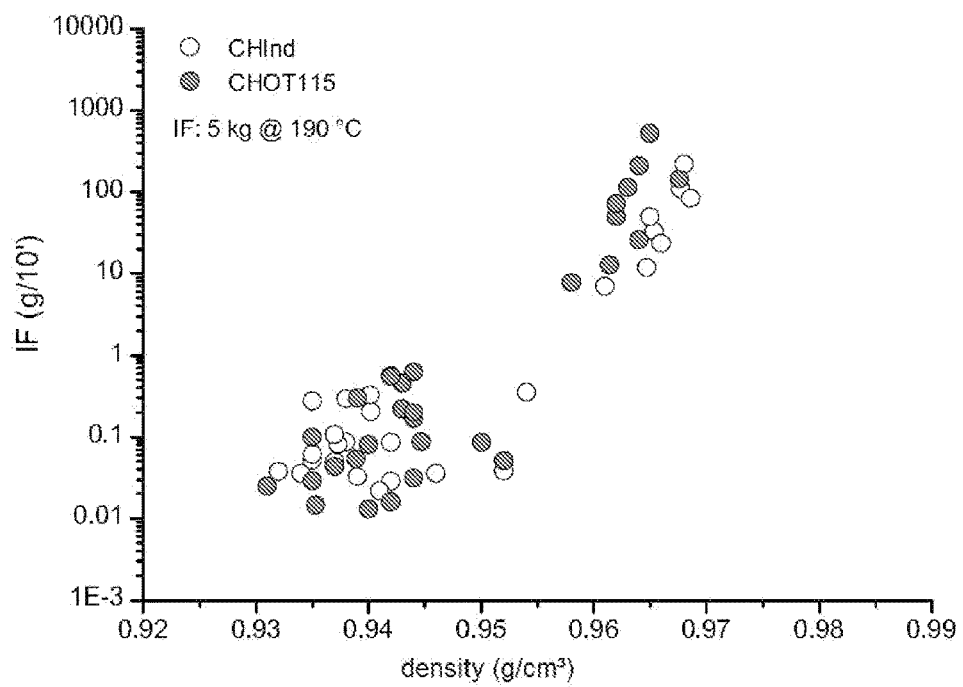
FIG. 3: IF and density region of the polymers produced by the catalysts CHOT115 and CHInd tested in Example 3.
Figure 4:
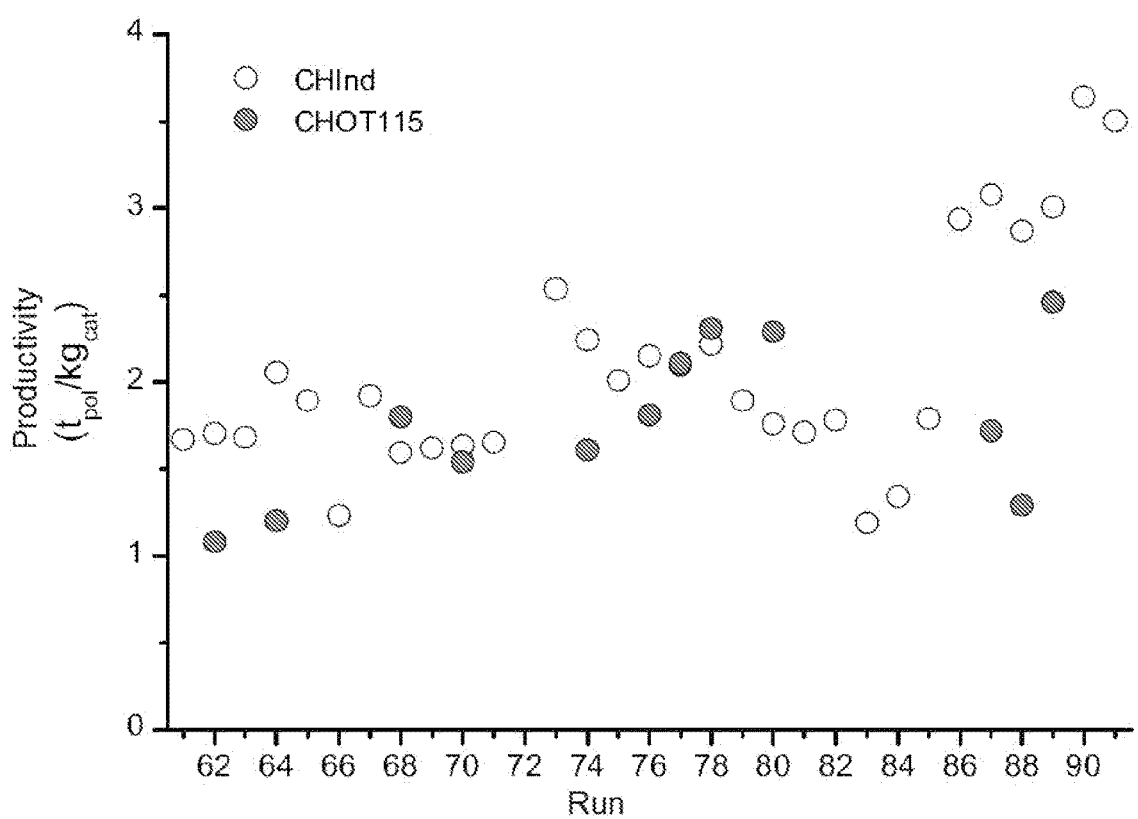
FIG. 4: Catalytic productivity of CHOT115 and CHInd for the different conditions of the reactor of the test in pilot plant, according to Example 3.

FIG. 3 shows the fluidity index (FI) and the density of the polymers obtained in each polymerization condition previously described in FIG. 2. As shown, the polymer produced with the CHOT115 catalyst has an IF higher than the respective copolymer obtained with CHInd in the region of density of 0.96-0.98 g·cm$^{-3}$ The results shown in FIG. 3 also proves that the CHOT115 catalyst can produce high and medium density polyethylene (0.98-0.93 g·cm$^{-3}$). FIG. 4 highlights that the average catalytic productivity of the CHT115 catalyst is similar to that of the CHInd catalyst. The average productivity of CHOT115 was 1.5 $t_{pol}·kg_{cat}^{-1}$, while the average productivity of the CHInd catalyst was 1.8 $t_{pol}·kg_{cat}^{-1}$.

Figure 5:
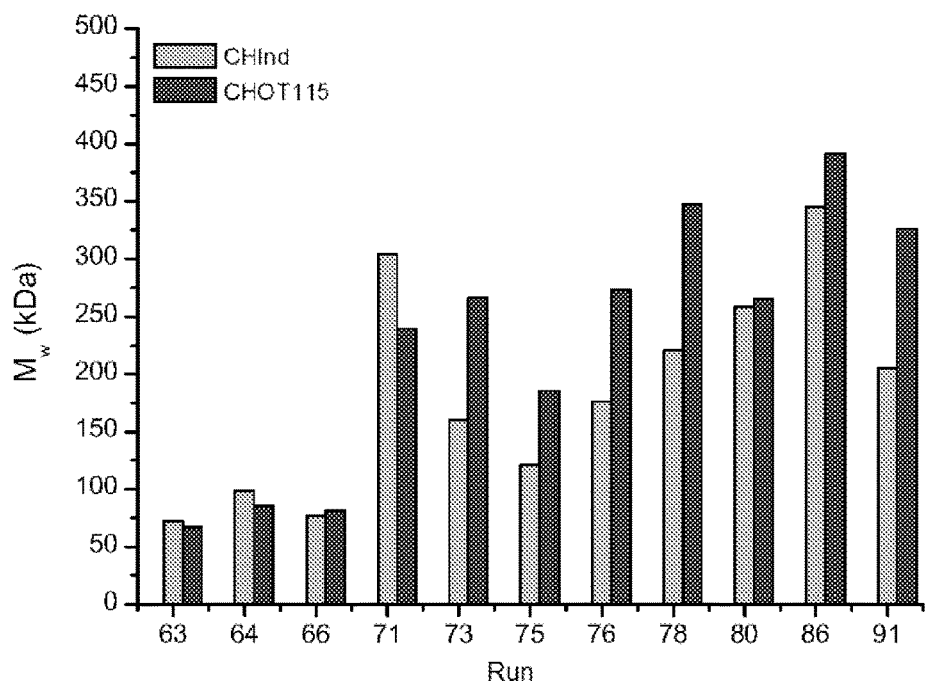
FIG. 5: Average molar mass of the polymers produced with CHOT 115 and CHInd in Example 3. (a) Mw and (b) Mz.
Figure 5:
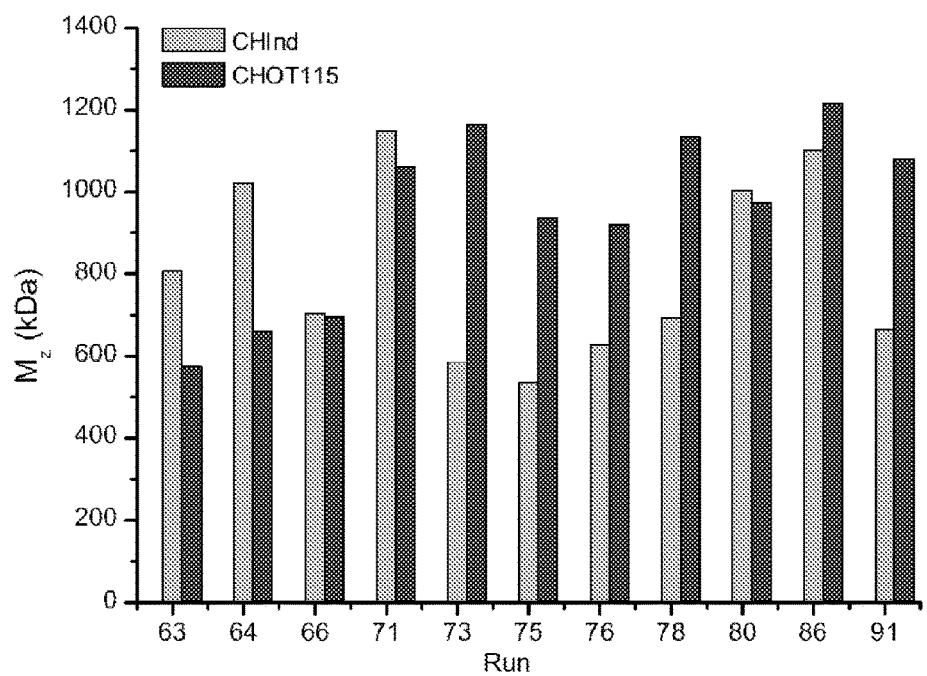

The average molar masses $M_w$ and $M_z$ of the polymers produced by CHOT115 and CHInd catalysts for different reaction conditions of the test are shown in FIG. 5. As shown, polymers produced by the respective catalysts are different in terms of molar mass distribution. In particular, CHOT115 catalyst, which contains a titanium oxopolymer, produces polymers with higher average molecular mass $M_w$ and $M_z$, in most of the polymerization conditions tested with regard to the respective polymers obtained with the CHInd catalyst.

According to Examples 1-3, the use of titanium oxopolymers in the synthesis of multisite heterogeneous catalysts results in a final catalyst able to produce ethylene polymer with differentiated properties, mainly relatively to molar mass distribution. It is feasible to regulate the average molar mass of the polymer as well as the molar mass distribution amplitude by using titanium oxopolymers in the catalyst. Example 3 clearly shows that the catalyst is industrially applicable, at least for producing high density polyethylene with adequately regulated properties to apply the polymer in the manufacture of goods such as cylindrical drums, drums, bottles, tubes and films.

What is claimed is:

1. A multisite heterogeneous catalyst which is suitable for reactions of olefin polymerization and olefin and alpha-olefin copolymerization comprising a support and a titanium oxopolymer in its active composition, the latter being an organometallic chemical compound having an oligomeric structure and a chemical formula according to Equation 1:

$$(R^a)_p M^a (O-Ti-O)_n M^b (R^b)_q \tag{1}$$

where: (O—Ti—O) is the monomeric unit of the oligomer formed by n units; $R^a$ and $R^b$ are alike or different substituents, and are a halogen an alkoxy group of linear or branched or cyclic or aromatic chain; $M^a$ and $M^b$ are alike or different and are transition metals of groups 4, 5 or 6 or, semi-metals of group 14 of the periodic table, wherein subindexes p and q of the substituents satisfy the coordination number of the respective M, and the polymerization level n is higher than or equal to 3, wherein the support is pre-treated with a Ziegler-Natta catalyst.

2. The multisite heterogeneous catalyst according to claim 1, wherein the titanium oxopolymer is synthesized via a non-hydrolytic sol-gel route.

3. The multisite heterogeneous catalyst according to claim 2, wherein the titanium oxopolymer produced through the chemical reaction of titanium (IV) chloride and titanium (IV) tetraalkoxide is catalyzed by a Lewis acid.

4. The multisite heterogeneous catalyst according to claim 3, wherein the reaction proceeds according to the stoichiometric ratios of the reagents, according to Equation 2 below:

$$CT:TAT=(1.5-3):1 \tag{2a}$$

$$TAT:CT=(1.5-3):1 \tag{b}$$

where: CT indicates the titanium (IV) chloride precursor and TAT, titanium (IV) tetraalkoxide.

5. The multisite heterogeneous catalyst according to claim 1, wherein the titanium oxopolymer is incorporated into the support through impregnation or precipitation technique.

6. The multisite heterogeneous catalyst according to claim 1, wherein the support is magnesium chloride or silica.

7. A process for preparing the multisite heterogeneous catalyst according to claim 1, comprising the incorporation of the titanium oxopolymer into a support through impregnation or precipitation, wherein the support is pre-treated with a Ziegler-Natta catalyst.

8. The process for preparing the multisite heterogeneous catalyst according to claim 7, wherein the titanium oxopolymer is produced through the chemical reaction of titanium (IV) chloride and titanium (IV) tetraalkoxide, catalyzed by a Lewis acid at temperature of 90-150° C., for a total reaction time of 2-12 hours, in a closed reactor provided with agitation.

9. The process for preparing the multisite heterogeneous catalyst according to claim 7, wherein the support (a) is magnesium chloride or silica, and (b) is treated by physical or chemical methods.

10. A process for obtaining polyolefins comprising a reaction of olefin polymerization and/or olefin and alpha-olefin copolymerization in the presence of a multisite heterogeneous catalyst, as defined in claim 1.

11. The process for obtaining polyolefins according to claim 10, wherein the multisite heterogeneous catalyst is combined with other catalytic compounds able to polymerize olefins and copolymerize olefins and alpha-olefins.

12. The process for preparing the multisite heterogeneous catalyst according to claim 9, wherein the physical methods comprise calcination or grinding.

13. The process for preparing the multisite heterogeneous catalyst according to claim 9, wherein the chemical methods comprise reaction with surface modifying agents or dissolution and reprecipitation.

14. The process for preparing the multisite heterogeneous catalyst according to claim 7, wherein the oxopolymer is synthesized via sol-gel route.

* * * * *